United States Patent [19]

Unick

[11] Patent Number: 5,178,470
[45] Date of Patent: Jan. 12, 1993

[54] BEARING PIN LOCKED BY KNURLING

[75] Inventor: John L. Unick, Colorado Springs, Colo.

[73] Assignee: North American Philips Corporation, New York, N.Y.

[21] Appl. No.: 797,846

[22] Filed: Nov. 26, 1991

[51] Int. Cl.[5] .................. F16C 33/02; F16C 33/20
[52] U.S. Cl. .................................. 384/276; 384/295
[58] Field of Search ............... 384/275, 276, 280, 281, 384/295, 296–300, 396

[56] References Cited

U.S. PATENT DOCUMENTS

| | | | |
|---|---|---|---|
| 2,720,119 | 10/1955 | Sherman | 384/297 X |
| 2,964,341 | 12/1960 | Doyle et al. | 384/299 X |
| 3,047,934 | 8/1962 | Magner, Jr. | 384/299 X |
| 3,895,408 | 7/1975 | Leingang | 384/280 X |
| 4,275,263 | 6/1981 | Chino | 384/297 X |

*Primary Examiner*—Thomas R. Hannon
*Attorney, Agent, or Firm*—David R. Treacy

[57] ABSTRACT

A bearing pin for simple, reliable attachment to a support. A bearing sleeve is pressed over a knurled surface of a pin which is fastened to the support. To prevent movement of the pin with respect to the support, the pin has a support engaging surface forming an edge with the knurled surface. The knurling is continued up to that edge, so that pin material is upset axially beyond the support engaging surface. Upon fastening of the pin to the support, the axially upset material bites into the surface of the support to prevent rotation of the pin. This same knurling, or alternative upset pattern, prevents relative movement between the bearing sleeve and the pin.

19 Claims, 2 Drawing Sheets

BEARING PIN LOCKED BY KNURLING

BACKGROUND OF THE INVENTION

1. Field of the Invention

Many mechanisms require that a link be journaled for sliding and/or pivoting movement with respect to a support. One well-known device for this function is a bearing pin which extends perpendicularly from a support to permit movement in a plane perpendicular to the pin axis. Because of the importance of low production and assembly costs, bearing pins are often as simple as possible, usually have relatively loose tolerances, and are held in place by inexpensive techniques, such as staking. To minimize friction in the operating mechanism, it is common to provide a low friction surface layer or sleeve, such as a bronze bushing or a plastic sleeve or coating.

2. Description of the Prior Art

The assembly of known bearing pins having sleeves or bushings is usually a source of undesirable compromise, with either cost or performance suffering. This is particularly true if it is desired that the bearing pin incorporate retainer or axial thrust surfaces to keep the link from sliding axially off the bearing pin. Probably the oldest solution to this problem, for a pin having a thrust surface at the free end, is to provide some kind of head to retain the link directly, or to retain a thrust washer. If the pin is made of steel or similar low cost, high strength material, either a lot of material below the head is removed, as by a turning operation in a lathe; or a head is formed by upsetting, with risk of deformation of the pin surfaces underlying the bearing surface; or a still more expensive technique is required.

A frequent requirement is that the bearing sleeve or bushing not move with respect to the pin. This is especially the case where movement between the bushing and pin will cause looseness, or generate wear particles which damage or contaminate the apparatus in which the mechanism is used. When the bushing is made of a soft bearing metal, such as brass or a porous bronze, the bushing may simply be a press fit over the pin, in which the interference between the bushing and the pin itself provides a sufficient grip. Alternatively, and especially where the bushing includes a thrust surface at the end of the bearing pin adjoining the support to which it is fastened, the pin could be relieved slightly with respect to the end face of the bearing bushing, so that the bushing itself is held tightly against the support. However, if the bearing bushing is made of a low friction plastic (synthetic resin) material, a sufficient interference fit to guarantee that there be no relative movement may distort the somewhat elastic material of the bushing sufficiently that the bearing surfaces are no longer sufficiently true cylindrical or planar surfaces.

SUMMARY OF THE INVENTION

An object of the invention is to permit assembly of a bearing sleeve on a pin, and assembly of the pin into a support, by a simple axial pressing movement.

Another object of the invention is to provide a bearing pin which can include low friction retaining or thrust surfaces for a link captured on the pin.

A further object of the invention is to prevent relative movement between the pin and the bearing sleeve, without need for an additional assembly step.

According to the invention, a bearing pin is made from two parts: a pin having a typically circular cylindrical bearing-engaging surface which extends to an annular shoulder which will abut the support, and a bearing sleeve. At least part of this cylindrical surface is covered by a pattern of upset features, such as knurling, to bite into and hold the sleeve. The upsetting of the cylindrical surface must extend all the way to the shoulder, so some small portions of the pin are also upset axially beyond the annular shoulder. When the pin is secured to the support, the axially upset portions of the pin will be pressed into the surface of the support, to keep the pin from rotating with respect to the support.

This principle can be applied to many different specific embodiments. The pin will usually have a securing portion, extending beyond the annular shoulder, which will serve both for locating the pin with respect to a hole in the support, and for retaining the pin against the support. If the support is not very thick, a protruding end can be staked over, or be threaded to allow use of a retaining nut.

According to the invention, the bearing sleeve or bushing can take many forms. It can, of course, be made of any known bearing metal. However for minimum cost and for low friction without need for a lubricant, synthetic resins such as nylon or polytetrafluoroethylene may be selected. The actual shape of the bushing is selected according to the bearing function to be performed, and the technique which will allow easiest assembly of the mechanism. If the bearing is used for a link which simply pivots or rotates about the pin axis, then it is generally desirable that the bushing be made in two pieces, one having a shoulder to provide a thrust bearing or retaining bearing surface. The other may be a simple bearing material washer which is pressed onto the bearing engaging surface of the pin after the pin and other sleeve portion have been fitted into the link; or can be assembled to the pin as the pin is being installed onto the support.

To avoid deformation of the bearing sleeve, it may be desirable that the cylindrical bearing-engaging portion of the pin extend beyond the sleeve, at the support engaging surface. This ensures that the retaining force holding the pin to the support actually causes the upset pin material to bite into the support surface, rather than simply placing a strain in the bearing sleeve.

Other features and aspects of the invention will be clear from the following description of preferred embodiments.

DESCRIPTION OF THE PREFERRED EMBODIMENTS

Figure 1:
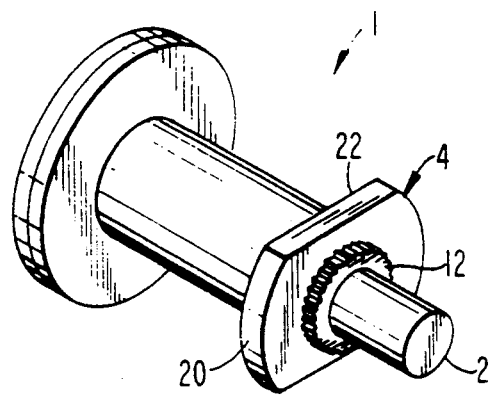
FIG. 1 is a perspective view of a first embodiment of a bearing pin according to the invention.
Figure 2:
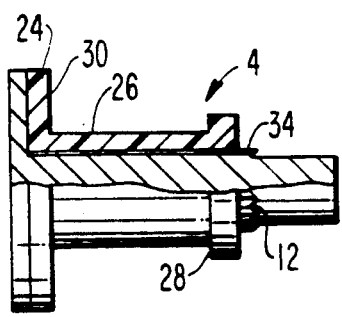
FIG. 2 is a side view, partly in section, of the embodiment of FIG. 1.
Figure 3:
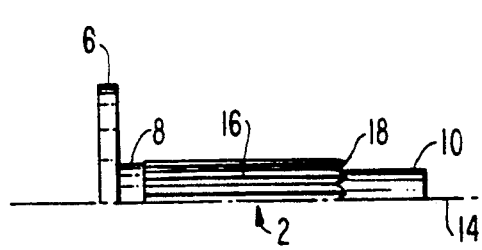
FIG. 3 is a partial side view of a pin used with the embodiment of FIG. 1.

The bearing pin shown in FIGS. 1 and 2 is especially useful for retaining and guiding a sliding link, which has an elongated groove through which the pin is fitted. As shown in FIG. 3, the pin 2 has a disc-shaped head portion 6, a circular cylindrical bearing-engaging surface 8, and a circular cylindrical retaining extension 10 extending from an annular mounting end surface 12, all of these surfaces being coaxial about a pin axis 14. Most of the length of the bearing engaging surface 8 is covered by a straight-knurled pattern 16 which extends entirely to the edge 18 between the circular cylindrical surface 8 and the planar end surface 12, so that portions of the pin material at the edge 18 are upset axially beyond the edge 18. For use in a high quality mechanism, the pin 2 may be made of a relatively hard metal, such as type 303 stainless steel.

The sleeve 4, which serves as a bearing bushing, is made from a single piece of a synthetic resin material. One end of the bushing is adjacent the mounting end surface 12, and has the shape of a circular cylindrical disc 20 having diametrically opposed flats 22 formed to permit the bushing to be passed through the slot of a link. At the other end, a disc-shaped portion 24 abuts the head 6 of the pin. A circular cylindrical bearing surface 26 extends between the disc-shaped portions 20 and 24, while the opposed faces 28 of the disc 20 and face 30 of the disc-shaped portion 24 form thrust bearing surfaces. As seen most clearly in FIG. 2, the sleeve 4 is forced over the bushing-engaging surface 8 of the pin 2 so that the knurled pattern 16 has an interference with the cylindrical inner surface. As a result the bushing is retained firmly on the pin, and will not rotate with respect to the pin.

To ensure that normal tolerance buildups do not prevent the edge 18 protrusions from biting into the surface of a support in which the pin has been set, the cylindrical surface 8 of the pin is made longer than the length of the bushing 4, so that a portion 34 of the bushing-engaging surface protrudes beyond that end of the bushing. This protrusion ensures that, when the bearing pin is installed against a supporting surface, tension in the retaining extension 10 holds the axially protruding portions of the knurled surface tightly against, and biting into, the support.

Figure 4:
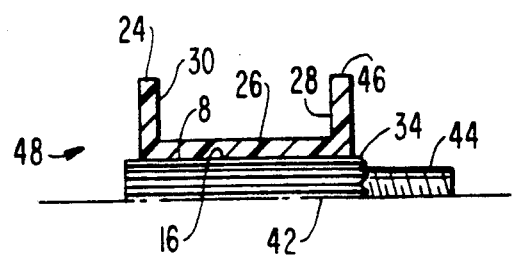
FIG. 4 is a partial longitudinal section of a second embodiment of the invention.

The embodiment of FIG. 4 is useful where the bearing bushing may need to be removed, as for maintenance activity on the mechanism. In this embodiment the pin 42 may be made from bar stock having a diameter equal to the bearing-engaging surface. The pin does not have any head, but rather has a knurled pattern 16 extending over the entire circular cylindrical bushing-engaging surface 8. To permit bearing pin removal from the support, retaining extension 44 is threaded so that it can be held against the inside surface of a support plate or sheet by a nut (not shown).

The bearing pin of FIG. 4 differs in another respect, which is especially advantageous if the bearing pin is used to journal a pivoting or rotating element. At the support-engaging end, the bearing sleeve has a circular cylindrical disc washer 46 whose inside diameter is preferably sized so that the washer is a light press fit over the knurled surface 16. The major portion of the bearing sleeve is formed by a bearing element 48 which has a disc-shaped portion 24 and circular cylindrical bearing surface 26, the same as the embodiment of FIG. 1. The bearing pin of FIG. 4 is assembled preferably by pressing the element 48 over the knurled surface 16 from the direction of the threaded extension 44, to a location which leaves enough room at the support engaging end of the pin 42 to allow for the thickness of the disc 46 and a protrusion 34. The pin 42 in element 48 are then installed in the bearing hole of the link, and the disc washer 46 is pressed over the protruding portion of the surface 8, thereby retaining the bearing pin assembly on the link.

Figure 5:
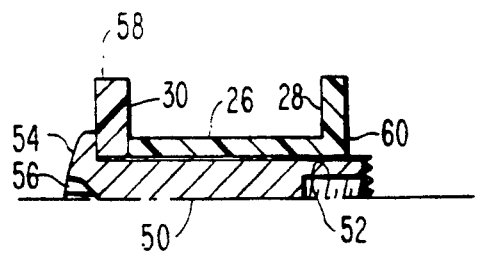
FIG. 5 is a partial longitudinal section of a third embodiment of the invention.

The embodiment of FIG. 5 is useful in circumstances where clearances during assembly do not permit pre-assembly of the bearing pin on the link, because there is not sufficient clearance for an extension 10. In this embodiment, the retaining means for a pin 50 is provided by a tapped hole 52 extending inward from the support-engaging end. At its free end, the pin 50 has a head 54 which may have a tool-engaging socket 56 formed therein, for example to permit engagement by a Phillips head screwdriver. In this embodiment, the bearing sleeve is again formed of two elements, in this case, the relatively thick disc washer 58 being at the free end of the bearing pin, and the element 60 providing the circular cylindrical bearing surface 26 and a thrust face 28 opposite the face 30 of the disc washer 58.

Figure 6:
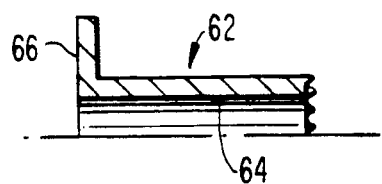
FIG. 6 is a partial longitudinal section of a pin for use in a fourth embodiment of the invention.

FIG. 6 shows another form of pin 62 which may be used where the bearing pin assembly is subject to relatively high thrust loads tending to pull the pin from the support. A longitudinal bore 64 through the pin 62 permits passage of a mounting screw. To prevent thrust loads from pulling the bearing sleeve off the pin, or deforming the thrust base 30, the pin includes a head 66 like the head 6 of the embodiment of FIGS. 1-3. This pin can be used advantageously with any of the bearing sleeve arrangements of the preceding embodiments.

Figure 7:
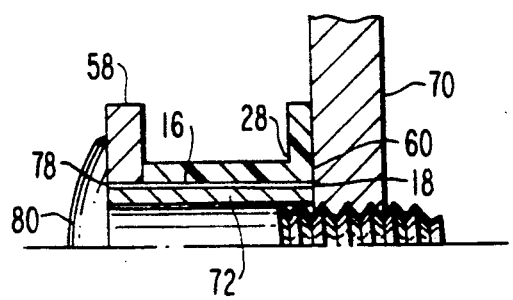
FIG. 7 is a longitudinal section of a fifth embodiment of the invention, showing it installed on a support.

The embodiment of FIG. 7 shows a bearing pin assembled to a support 70. In this embodiment a pin 72 has a lowest possible manufacturing cost. It is made from a length of thick-walled metal tubing, having a knurling pattern 16 formed along the entire length of the piece of tubing after the tubing has been cut from a longer length of stock. As a result, the pattern 16 will cause metal to be upset axially at both the edges 18 and 78, at opposite ends of the pin 72. This embodiment is shown used with a bearing sleeve the same as that of FIG. 5, except for the technique of assembly of the bearing pin. In this embodiment, it is ensured during manufacture that the combined axial length of the disc washer 58 and the element 60 are less than the length of the pin 72. Ease of assembly may be obtained through pre-assembly of the element 60 on the pin 72, but without need for special attention to have any protruding end portion 34. At the time of final assembly, the disc washer portion 58 is forced partly over the knurled surface 16 of the pin 72. The entire assembly is installed using a standard self-tapping screw 80 which is passed through the bore of the pin 72 to cut its own thread in a pre-existing hole in the support 70. When the screw 80 is fully tightened, it will press the disc washer 50 and element 60 toward each other, while at the same time the axial protrusion of the knurled pattern 16 at the edges 18 and 78 will cause the pin to bite into the support 70 and into the head of the screw 80 so as to lock the pin 72 permanently and firmly in place. Because the combined links of the disc washer 58 and bearing element 60 have been made less than the link of the pin 72, it is assured that the screw tension is applied against the pin 72, rather than as the formation of the bearing sleeve.

Other variations of a bearing pin according to the invention will be apparent to those of ordinary skill in the art. If the support is made of a material of relatively low hardness, it may be feasible to use a pin made of a non-metallic material, such as a relatively rigid synthetic resin. Where the resin is somewhat thermoplastic, it may be economic to form the upset features with a heated tool. The bearing sleeve itself can be made of any known bearing metal, with or without inherent lubricating properties.

Although for simplicity sake most bearing pins are essentially bodies of revolution, the invention is not so limited. The pin itself need not be cylindrical, but might for example be made of square stock, having an upset pattern formed on one or more of the flat surfaces. The bearing surface of the sleeve need not be cylindrical, but might also be rectangular in cross section, and might also be tapering rather than of constant cross section along its length. Thus, the invention is intended to encompass any device falling within the spirit and scope of the appended claims.

I claim:

1. A bearing pin comprising a pin made of a pin material, and a bearing bushing, for attachment to a supporting element, said pin having a mounting end surface having a perimeter edge; a bushing-engaging surface extending away from said edge of the end surface, said bushing being tightly fitted around said bushing-engaging surface; and means for securing the pin to a supporting element with at least a portion of said end surface engaging the supporting element, characterized in that said bushing-engaging surface has a pattern of upset features formed therein for engaging the bushing to prevent relative motion between the pin and the bushing, said pattern extending to said edge such that portions of the pin material are upset axially beyond said perimeter edge and said bushing, for locking the pin against relative movement with respect to the supporting element.

2. A bearing pin as claimed in claim 1, characterized in that said mounting end surface is a planar surface, said bushing-engaging surface is a circular cylindrical surface, and said pattern of upset features extends over the entire bushing-engaging surface.

3. A bearing pin as claimed in claim 2, characterized in that said bushing has a first end adjacent said mounting end surface, said first end being spaced from the mounting end surface such that a portion of the bushing-engaging surface protrudes beyond said first end.

4. A bearing pin as claimed in claim 3, characterized in that said bushing has a second end spaced from said end adjacent the end surface; a respective flange extending outwardly at each of said ends, each of said flanges having a generally planar face facing the other flange, said faces being parallel to each other; and a bearing surface extending between said flanges and on both said faces.

5. A bearing pin as claimed in claim 4, characterized in that one of said flanges has a circumferential surface with at least one flat formed therein, at the location of each flat the flange extending a distance, from the bearing surface between the flanges, less than other portions of the flange.

6. A bearing pin as claimed in claim 4, characterized in that said one of said flanges is adjacent the pin mounting end surface.

7. A bearing pin as claimed in claim 1, characterized in that said bushing has an end adjacent said mounting end surface, the end of the bushing being spaced from the mounting end surface such that a portion of the bushing-engaging surface protrudes beyond said end of the bushing.

8. A bearing pin as claimed in claim 7, characterized in that said pattern of upset features consists of a knurled pattern.

9. A bearing pin as claimed in claim 8, characterized in that said bushing has a second end spaced from said end adjacent the end surface; a respective flange extending outwardly at each of said ends, each of said flanges having a generally planar face facing the other flange, said faces being parallel to each other; and a bearing surface extending between said flanges and on both said faces, and one of said flanges has a circumferential surface with at least one flat formed therein, at the location of each flat the flange extending a distance, from the bearing surface between the flanges, less than other portions of the flange.

10. A bearing pin as claimed in claim 1, for attachment to a supporting element made of a material having a hardness less than a given hardness, characterized in that said pin material has a hardness greater than said given hardness.

11. A bearing pin comprising a metal pin and a synthetic resin bearing bushing, said pin having a generally planar mounting end surface having a circular perimeter edge defining an axis; a circular-cylindrical bushing-engaging surface extending axially away from said edge of the end surface, said bushing being tightly fitted about said bushing-engaging surface; and a retaining portion extending from the mounting end surface in a direction away from said bushing-engaging surface for securing the pin to a supporting element with said end surface engaging the supporting element, characterized in that said bushing-engaging surface has a knurled pattern formed therein for engaging the bushing to prevent relative motion between the pin and the bushing, and said pattern extends to said edge such that portions of the pin material, radially outward from said retaining portion, are upset axially beyond said generally planar mounting end surface and beyond said bushing for locking the pin against relative movement with respect to the supporting element when said retaining portion is secured to the supporting element.

12. A bearing pin as claimed in claim 11, characterized in that said knurled pattern extends over substantially the entire bushing-engaging surface.

13. A bearing pin as claimed in claim 12, characterized in that said bushing has a first end adjacent said mounting end surface, said first end being spaced from the mounting end surface such that a portion of the bushing-engaging surface protrudes beyond said first end,.

14. A bearing pin as claimed in claim 13, characterized in that said bushing has a second end spaced from said end adjacent the end surface; a respective flange extending outwardly at each of said ends, each of said flanges having a generally planar face facing the other flange, said faces being parallel to each other; and a bearing surface extending between said flanges and on both said faces.

15. A bearing pin as claimed in claim 14, characterized in that one of said flanges has a circumferential surface with at least one flat formed therein, at the location of each flat the flange extending a distance, from the bearing surface between the flanges, less than other portions of the flange.

16. A bearing pin as claimed in claim 14, characterized in that said one of said flanges is adjacent the pin mounting end surface.

17. A bearing pin as claimed in claim 11, characterized in that said bushing has an end adjacent said mounting end surface, the end of the bushing being spaced from the mounting end surface such that a portion of the bushing-engaging surface protrudes beyond said end of the bushing.

18. A bearing pin as claimed in claim 17, characterized in that said pattern of upset features consists of a knurled pattern.

19. A bearing pin as claimed in claim 18, characterized in that said bushing has a second end spaced from said end adjacent the end surface; a respective flange extending outwardly at each of said ends, each of said flanges having a generally planar face facing the other flange, said faces being parallel to each other; and a bearing surface extending between said flanges and on both said faces, and one of said flanges has a circumferential surface with at least one flat formed therein, at the location of each flat the flange extending a distance, from the bearing surface between the flanges, less than other portions of the flange.

* * * * *